US005804081A

United States Patent [19]
DeGesero et al.

[11] Patent Number: 5,804,081
[45] Date of Patent: Sep. 8, 1998

[54] WASTEWATER TREATMENT

[75] Inventors: Roy A. DeGesero, Katy; Darrell A. Mauller, Cypress; Michael J. Snakard, Houston, all of Tex.

[73] Assignee: Radian International LLC, Austin, Tex.

[21] Appl. No.: 878,151

[22] Filed: Jun. 18, 1997

Related U.S. Application Data

[63] Continuation of Ser. No. 432,288, May 1, 1995, abandoned.

[51] Int. Cl.$^6$ .................................................. C02F 1/00
[52] U.S. Cl. ......................... 210/741; 210/800; 210/805; 210/90; 210/103; 210/170; 210/188; 210/532.1; 210/538
[58] Field of Search .................................. 210/170, 776, 210/779, 800, 805, 103, 90, 97, 741, 747, 750, 188, 532.1, 538

[56] References Cited

U.S. PATENT DOCUMENTS

| | | |
|---|---|---|
| 484,823 | 10/1892 | Scruby . |
| 2,809,933 | 10/1957 | Halvorson . |
| 2,881,923 | 4/1959 | Nelson ..................................... 210/525 |
| 3,192,155 | 6/1965 | Bready et al. ........................... 210/705 |
| 3,231,490 | 1/1966 | Fry . |
| 3,371,033 | 2/1968 | Simmons et al. . |
| 3,876,536 | 4/1975 | Pradt et al. . |
| 3,960,717 | 6/1976 | Wyatt . |
| 4,370,233 | 1/1983 | Hayes et al. ............................. 210/609 |
| 4,483,774 | 11/1984 | Brill et al. ............................... 210/258 |
| 4,508,545 | 4/1985 | DeLoach . |
| 4,509,168 | 4/1985 | Benjes et al. ............................ 210/151 |
| 4,632,758 | 12/1986 | Whittle ................................... 210/603 |
| 4,894,162 | 1/1990 | Cournoyer et al. ..................... 210/603 |
| 5,021,161 | 6/1991 | Caltharp ................................. 210/614 |
| 5,102,005 | 4/1992 | Trussler ................................. 220/4.12 |
| 5,200,065 | 4/1993 | Sinclair et al. ......................... 210/104 |
| 5,234,606 | 8/1993 | Kazama et al. ........................ 210/748 |
| 5,380,446 | 1/1995 | Bratten ................................... 210/805 |
| 5,437,786 | 8/1995 | Horsley et al. ......................... 210/170 |
| 5,447,642 | 9/1995 | Schenach ............................... 210/774 |
| 5,466,380 | 11/1995 | Bratten ................................... 210/741 |
| 5,518,610 | 5/1996 | Pierpoline .............................. 210/115 |

FOREIGN PATENT DOCUMENTS

| | | |
|---|---|---|
| 2215396 | 8/1974 | France . |
| 2536739 | 9/1979 | France . |

OTHER PUBLICATIONS

"Separateur DLR," A.T.E. Separepur, DC 933762.
"Application Report 92–057N001," John Meunier, Sep. 1993.
"Application Report 920115N003," John Meunier, Sep. 1993.
"Texas Operations Wastewater Treatment Plant," The Dow Chemical Company, Mar. 1992.

Primary Examiner—Robert Popovics

[57] ABSTRACT

A wastewater treatment system has been created in which water to be treated is moved into a treatment vessel without pumping action of a pump. Such movement is facilitated by creating and, in some aspects, maintaining a vacuum in the treatment vessel to effect siphoning action to move water to and through the vessel. In one embodiment the treatment vessel is contained within a wastewater collection container, e.g. a below-grade concrete pit of an existing wastewater collection system. In another aspect the system is sealed so undesirable vapors are not vented to the atmosphere.

9 Claims, 4 Drawing Sheets

WASTEWATER TREATMENT

CROSS-REFERENCE TO RELATED APPLICATION

This is a continuation of application Ser. No. 08/432,288 filed May 1, 1995, now abandoned.

BACKGROUND OF THE INVENTION

1. Field of the invention

This invention is directed to storm water and wastewater treatment; and in one particular aspect, to a method and apparatus for separating components from wastewater using a vacuum system to effect siphoning action for moving the wastewater into a treatment vessel; and in another particular aspect to such a system for a below-grade wastewater collection system.

2. Description of related art

The prior art discloses a variety of methods and systems for treating and cleaning storm water and wastewater ("effluent"). "Effluent" includes any water contaminated with oil, chemicals like sulfides, grease hydrocarbons and/or suspended solids such as sand, dirt, coke fines, heavy hydrocarbons, etc. Industrial plant (petrochemical, etc. effluents) and rainwater run off from such facilities are within the scope of the term "wastewater."

In many prior art effluent treatment systems, the water to be treated is pumped to and from a treatment vessel. The pumping action can cause the emulsification of various components in the water stream, e.g. oil or other petroleum products. To inhibit such emulsification, emulsion-breaking chemicals and special emulsion treating equipment are used, thereby increasing capital and operating costs. The equipment can create an added power demand for the system. For systems with underground treatment vessels, the pumping requirements are significant and demand a large amount of power. Serious problems arise during power outages.

In prior art systems that do not adequately remove suspended solids at an initial point early in the system, downstream equipment can be damaged or eroded by the solids. Many prior art systems have in-ground, below-grade oily water separators whose maintenance is costly and time-consuming, especially in systems that have been covered to reduce air emissions. Various components of in-ground systems, e.g. tanks and vessels, may leak contaminants into a ground water supply.

There has long been a need for effective and efficient wastewater treatment systems and methods, particularly for systems with underground treatment vessels and collection bays. There has long been a need for such systems and methods which effectively deal with problems associated with emulsification of components of a wastewater stream. There has long been a need for such methods and systems which use power economically and efficiently. There has long been a need for such systems and methods in which the amount of unusable products is reduced. There has long been an unrecognized need to simplify existing in-ground systems and overcome problems associated with them.

SUMMARY OF THE PRESENT INVENTION

The present invention, in one embodiment, discloses an effluent treatment method in which effluent is siphoned into a treatment vessel by providing a vacuum in the vapor space at a top of the vessel. In one aspect the vacuum is provided by an eductor past which water is pumped to create suction. The pumped water may be, in certain embodiments, effluent such as storm water, wastewater or already-processed water. The pumped water may be returned to a storage tank or fed back through the treatment vessel. In one embodiment the vessel contains one or more solids separators, including but not limited to filters, screens, or separator lamella plate packs, through which the effluent flows, on which suspended solids move and agglomerate and up against which oil, grease etc. flow. Such solids fall to the bottom of the tank and are removed while a layer of oil and/or other lighter-than-water substances form a top layer on the effluent which is collected in a sump from which they are pumped from the vessel. Cleaned effluent exits the vessel for use, storage, or further processing including but not limited to, recycling through an inlet effluent bay and the vessel.

In one embodiment the vessel is below ground within an existing concrete structure or bay and has an inlet effluent bay and an outlet collection bay that receives the treated effluent. For ease of operation, inlet and outlet weirs may be used in the vessel to facilitate start-up, flow, and siphoning action. In other embodiments, no weirs are used.

In certain preferred embodiments of systems according to this invention, two or more vessels and two or more high capacity system process pumps are used so that the system can handle unusually large increases in water flow, e.g. in the event of a storm. In other preferred embodiments, all vessels, lines, devices, controllers, and connections are sealed and all vapors are collected so that they do not escape to the atmosphere. In certain embodiments, an inert gas, e.g. nitrogen, is provided under pressure to the treatment vessels to prevent implosion due to an uncontrolled vacuum increase, while preventing explosive conditions in the system.

With systems and methods as described above, siphoning action, once started, continues until the vacuum is broken. Operation without a vacuum is possible (although not preferable) if no inlet and outlet weirs are used, but then pumping and/or appropriate valving is needed.

The present invention, in one aspect, discloses a method for treating wastewater containing contaminates in a vessel, the vessel having an inlet for the contaminated wastewater and an outlet for treated wastewater from which contaminates have been separated, the vessel having a top opening and a bottom, the method comprising: drawing wastewater into the vessel with a vacuum applied at the top opening, creating a siphoning action which effects flow of the wastewater from the inlet through the vessel to the outlet; and flowing the wastewater through separation apparatus in the vessel to separate contaminates from the wastewater so that wastewater with contaminates separated therefrom flows out the outlet.

The present invention, in one aspect, discloses a method for treating wastewater containing contaminates and contaminating suspended solids in a vessel, the vessel having an inlet for the contaminated wastewater and an outlet for treated wastewater from which contaminates have been separated, the vessel having a top opening and a bottom, the method comprising: drawing wastewater into the vessel with a vacuum applied at the top opening, creating a siphoning action which effects flow of the wastewater through the vessel to the outlet, the vacuum applied by an eductor device with suction created by pumping water through it with a pump; flowing the wastewater through separation apparatus in the vessel to separate contaminates from the wastewater so that wastewater with contaminates separated therefrom flows out the outlet; flowing the wastewater with contaminates separated therefrom into a collection bay in fluid communication with the outlet, a top level of wastewater in the vessel above the collection bay into which flows wastewater with contaminates separated therefrom; collecting lighter-than-water contaminates in a sump in the vessel; pumping collected lighter-than-water contaminates from the sump and out of the vessel; monitoring vacuum level in the vessel; providing inert gas under pressure into the vessel to prevent the eductor device from collapsing the vessel; separating suspended solids from the wastewater with the separation apparatus; and removing separated suspended solids in a fluid stream with water from the bottom of the vessel, the fluid stream 20% or less solids by weight.

It is, therefore, an object of at least certain preferred embodiments of the present invention to provide:

New, useful, unique, efficient, nonobvious systems and methods for wastewater treatment;

Such systems and methods in which wastewater component emulsification is inhibited or eliminated and equipment erosion by entrained solids is inhibited or eliminated;

Such methods and systems with which undesirable vapors are contained, collected, and not released to the atmosphere;

Such methods and systems in which wastewater to be treated is moved into a vessel without pumping action of a pump across a hundredfold range of water flows;

Such methods and systems for incorporation into existing, below grade water collection/processing systems and for facilitating access to and maintenance of such systems; and Such systems and methods which automatically process significantly increased water flow.

Certain embodiments of this invention are not limited to any particular individual feature disclosed herein, but include combinations of them distinguished from the prior art by their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments. A dotted line indicates an electrical line.

DESCRIPTION OF EMBODIMENTS PREFERRED AT THE TIME OF FILING FOR THIS PATENT

Figure 1:
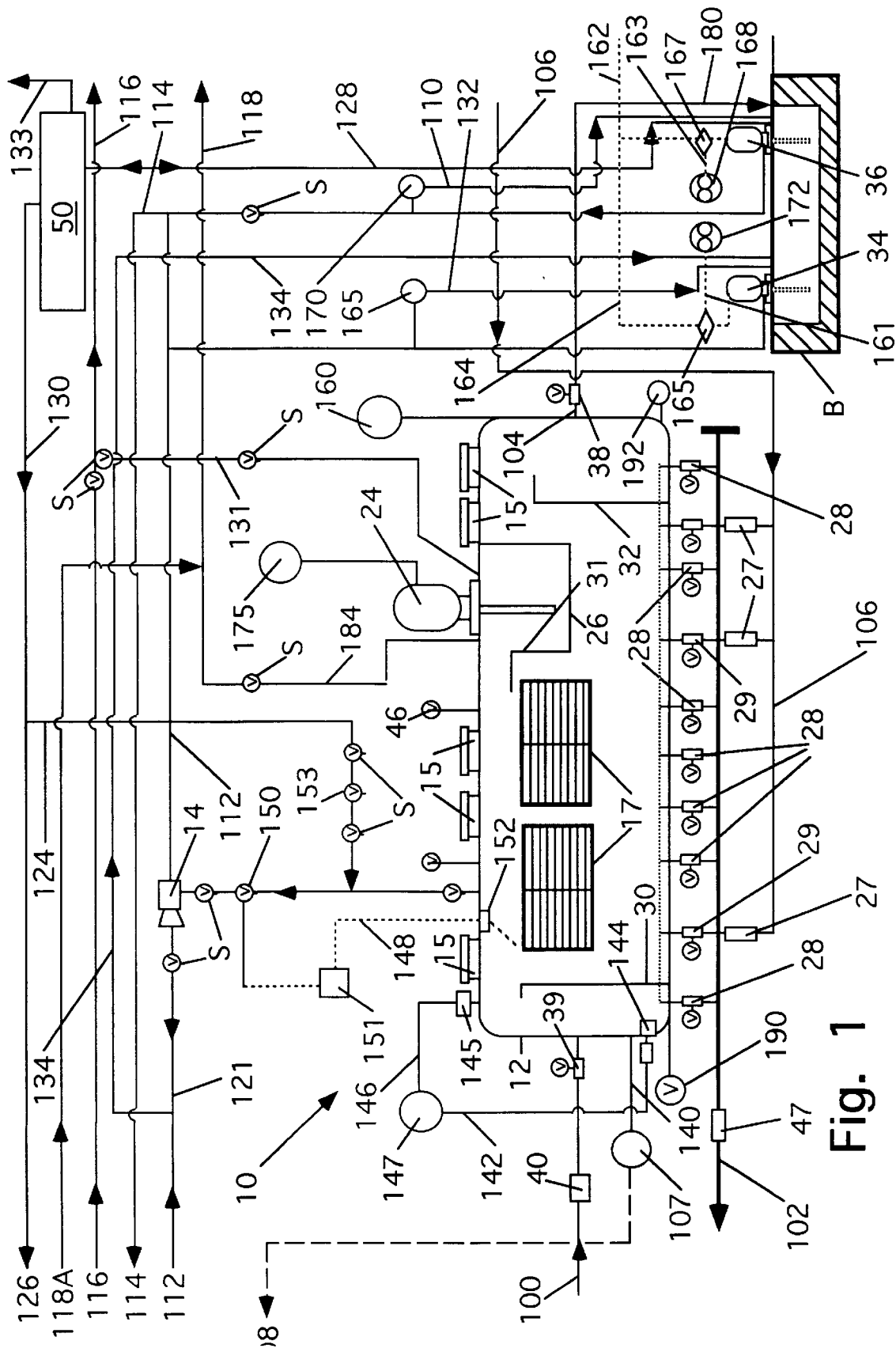
FIG. 1 is a schematic diagram of a system according to the present invention.

Referring now to FIG. 1, in a sewer water collection system 10 according to the present invention a vessel 12 according to the present invention has an inlet line 100 through which wastewater is introduced into the vessel 12. In one embodiment such a vessel is preferably made from carbon steel, is about eleven feet three inches (3.4 meters) in diameter and about fifty-four feet (16.45 meters) in length with a volume of approximately 103,500 gallons (gross) (391,789 liters) and with a plurality of manways 15, each about two or two-and-a-half feet (0.6 or 0.8 meter) in diameter, for accessing the vessel's interior. Mounted within the vessel 12 are a series of lamella separator plate packs 17, shown schematically in FIG. 1.

Solids and heavy compounds separated from the wastewater exit vessel 12 with water through nozzles 28 (normally open) to line 102 and are then, preferably, routed to a pump (not shown) for pumping (e.g. at a rate sufficient to remove collected solids from the bottom of the vessel) to a device for liquid-solid separation, e.g. a hydrocyclone (not shown in FIG. 1). Valves on the nozzles 28 may be closed for maintenance. A valve 47 selectively controls flow in the line 102. Preferably the solid/liquid pumped to the hydrocyclone is 20% or less solids by weight and most preferably 2% or less solids by weight.

Lighter-than-water materials, e.g. oil, grease, etc. (henceforth collectively referred to as "oil") separated from the wastewater accumulate in a sump 26 from which a pump 24 pumps them through lines 184 and 118 to a recovery system (not shown). A line 118A (e.g. a line from another lighter-than-water pump located in a second treatment vessel) flows into the line 118. Fugitive vapors from around the seals of the pump 24 are conducted through lines 131 and 116 to a vent collection system (not shown). A pressure relief device 175 relieves the pump 24 if the pump discharge is blocked (e.g. a valve in the pump's line is closed).

An eductor 14 maintains a vacuum in the vessel 12 via a line 122 effecting the siphoning of wastewater in through the inlet line 100 to a space in the vessel 12 to one side of an inlet weir 30 (to the left of weir 30 in FIG. 1). Once the wastewater level exceeds the height of the inlet weir 30 [e.g. ten feet (3 meters)] it flows over the inlet weir 30 and into a space between the in let weir 30 and an outlet weir 32 [also, in one embodiment, ten feet (3 meters) high]. If the wastewater source and/or wastewater entry point to the vessel 12 are level with or at a lower elevation than the vessel, the eductor 14 serves to "lift" the wastewater into the vessel 12. Suction is drawn on the eductor 14 (in fluid communication with a top vapor space in the vessel 12) by pumping water, e.g. but not limited to a portion of the vessel's effluent water in lines 114, 182 and 120 with the pumps 34 and/or 36 through the eductor 14. The water exits the eductor 14 in a line 121 and flows into a line 134 for return to a collection bay B. Water from another source or vessel (such as the vessel 12) flows through a line 112 to the line 134 (e.g. during periods of low flow in line 100 or discharge from another eductor).

A heat source, e.g. one or more steam coils (not shown), may be provided in the vessel(s) to heat material that has settled to the bottom of the vessel to render it less viscous so it will flow more easily.

Nitrogen flows into the vessel 12 from a nitrogen supply system 50 through lines 130, 124 and 122. If the vacuum in the vessel drops below a desired setpoint (e.g. 10.8 p.s.i.a. or 9 inches Hg), a self-contained back pressure regulator 153 opens permitting nitrogen flow into the vessel to maintain it at the desired pressure level (e.g. 10.8 p.s.i.a.). If the pressure controller 150 on line 122 fails, then nitrogen is provided by the nitrogen supply system 50 through the line 130 and the self-contained back pressure regulator valve 153 to prevent the eductor 14 from imploding the vessel 12 (e.g. if air entered the system in a vacuum relief event). Nitrogen may also be supplied through a line 126 for a similar system with another treatment vessel. Nitrogen in line 128 from the nitrogen supply system 50 maintains a positive pressure (e.g. one-quarter inch Hg) on the collection bay B where the pumps 34 and 36 are located to isolate the pumps from flammable mixtures. Gasses may also vent from the pumps in the line 128.

Oil droplets coalesce into a mass and form an oil layer floating on the top of the wastewater in the vessel 12. An adjustable oil skimming weir 31 allows the oil layer to overflow into the sump 26.

Cleaned wastewater is discharged through a line 104, a line 178, coupling 42, and a line 180 to a process pump or pumps (like pump P5, FIG. 2) for pumping through a line 114 from the collection bay B.

In one embodiment the sewer collection system is sixteen feet (4.9 meters) below grade and the vessel 12, also below grade, is higher than the sewer collection system [up to 32 feet (9.8 meters) higher]. This arrangement allows the continued use of existing below-grade sewer and separator piping and vessels. In other embodiments the vessel(s) may be above grade. Preferably multiple process pumps are used, e.g. two or more; each pump alone capable of providing the pumping capacity for normal flow entering the vessel 12 [e.g. 1,000 gallons (3780 liters) per minute]. In the event of abnormal wastewater flow rates, e.g. after a storm, the pumps are progressively placed in service to handle the increased wastewater flow [e.g. 11,000 gallons (41,635 liters) per minute up to 25,000 gallons (94,625 liters) per minute or more]. This can be done automatically by a level switch in the collection bay B which signals each pump to begin operation at a set water level. With all pumps in service, water from lines 176 and 114 is pumped past the eductor 14 via line 120 by the pumps 34 and/or 36, respectively. Water returns back to the collection bay B via line 134. Line 112 may be an eductor return line from another vessel(not shown) which joins with water in the line 120. In the event that it is desired to evacuate the vapor space in the vessel 12 relatively quickly, e.g. during startup (e.g. 40 SCFM), both pumps 34 and 36 may be used by opening all inlet, outlet and suction blocking valves S to the eductor and then starting the pumps.

The lamella plate packs 17 are, in one embodiment, commercially available John Meunier Company lamella plate separators which separate out solid particles less than one-quarter inch in diameter. Water passes through and over the plate packs and flows by siphoning action to an outlet line 104.

To facilitate the pumping of a sludge with solids and heavy hydrocarbons which have settled to the bottom of the vessel 12, clean water (e.g. effluent water from line 114) is pumped in line 106 by process pump(s) (e.g. like a pump or pumps P5 as in FIG. 2) into the bottom of the vessel 12 through valves 27 and 29. The valves 27, 29 are used in series so that one set, e.g. the valves 27, may be located above grade when the vessel is below grade so that flow from the vessel may be controlled either from above grade or from below grade. Such a clean water flow also inhibits or prevents the undesirable solidification of sludge solids at the bottom of the vessel.

Lines 132 and 134 are relief lines for the pumps 34 and 36, i.e. they open into the collection bay B if pressure in lines 132, 134 exceeds a certain level. Button 172, interconnected with a logic shutdown device 165 in the line 164 via a line 161, is a start/stop button for the pump 34. Button 168, interconnected with a logic shutdown device 167 in line 166 via a line 163, is a start/stop button for the pump 36. Instrument control signals from a switch (not shown) are sent to pump 34 via the lines 162 and 164 and to the pump 36 via the lines 162 and 166 in order to shut the pumps off. Devices 165 and 170 are pressure relief devices for the pumps 34 (via line 132), 36 (via line 110) respectively.

The vessel system as shown in FIG. 1 is fluid-tight so that no vapors vent to atmosphere and to permit and enhance siphoning action.

A flexible coupling 40 in the inlet line 100 and a flexible coupling 42 between the line 180 and a line 178 accommodate thermal contraction and expansion of the lines and of the vessel 12.

An outlet valve 38 selectively prevents fluid flow in the line 180 and an inlet valve 39 selectively prevents fluid flow in the line 100, e.g. to take the vessel out of service.

A vessel vacuum relief device 46 (including, but not limited to, commercially available devices and the device disclosed in pending U.S. patent application Ser. No. 08/162,729 filed on Dec. 3, 1993 now U.S. Pat. No. 5,520, 209 issued May 28, 1996 and co-owned with this invention and application) is set to protect against a vacuum of 7.2 p.s.i.a. The vessel 12 also has a pressure relief device 160 set to protect against a high pressure, e.g. 20 p.s.i.g.

Valves 190 and 192 enable the vessel's inlet space and outlet space to be drained.

Sensors 144, 145 associated with lines 142, 146 respectively and interconnected with level controller 147 indicate the liquid level in the vessel 12 upstream of the inlet weir 30 (e.g. by differential pressure measurement). If this level falls below a certain set level [e.g. ten feet 93 meters) in a two-weir vessel or ten feet (3 meters) in a vessel without internal weirs], then an alarm signal is generated by an alarm device level switch 107 with a vessel sensing line 140 and is sent to a controller in a control room (not shown) via line 108. If this level exceeds a certain set level, then an alarm is sounded and, if the level continues to rise, a second alarm is sounded and control valve regulator 150 is automatically closed. The vacuum in the vessel 12's vapor space is measured by a monitoring/alarm system 151 interconnected with the control valve regulator 150 mounted on the suction side of the eductor 14 between the vessel 12 and the eductor 14. Line 148 is connected to a sensor 152 for sensing the pressure in tie vessel 12, and is electrically interconnected with the pressure controller 150. The monitoring/alarm system 151 signals the control valve regulator 150 if the fluid level in the vessel 12, sensed by the level sensor 152, exceeds a predetermined maximum level; and controller 150 then closes. If the level in the collection bay falls too low, the pumps are turned off automatically [e.g. by a process controller or relay controller (such as the level switch 107 and hardwired relays from the switch to the pump motor starters)].

Device 160 is a vessel relief device. Valves S control flow in the lines indicated.

Figure 2:
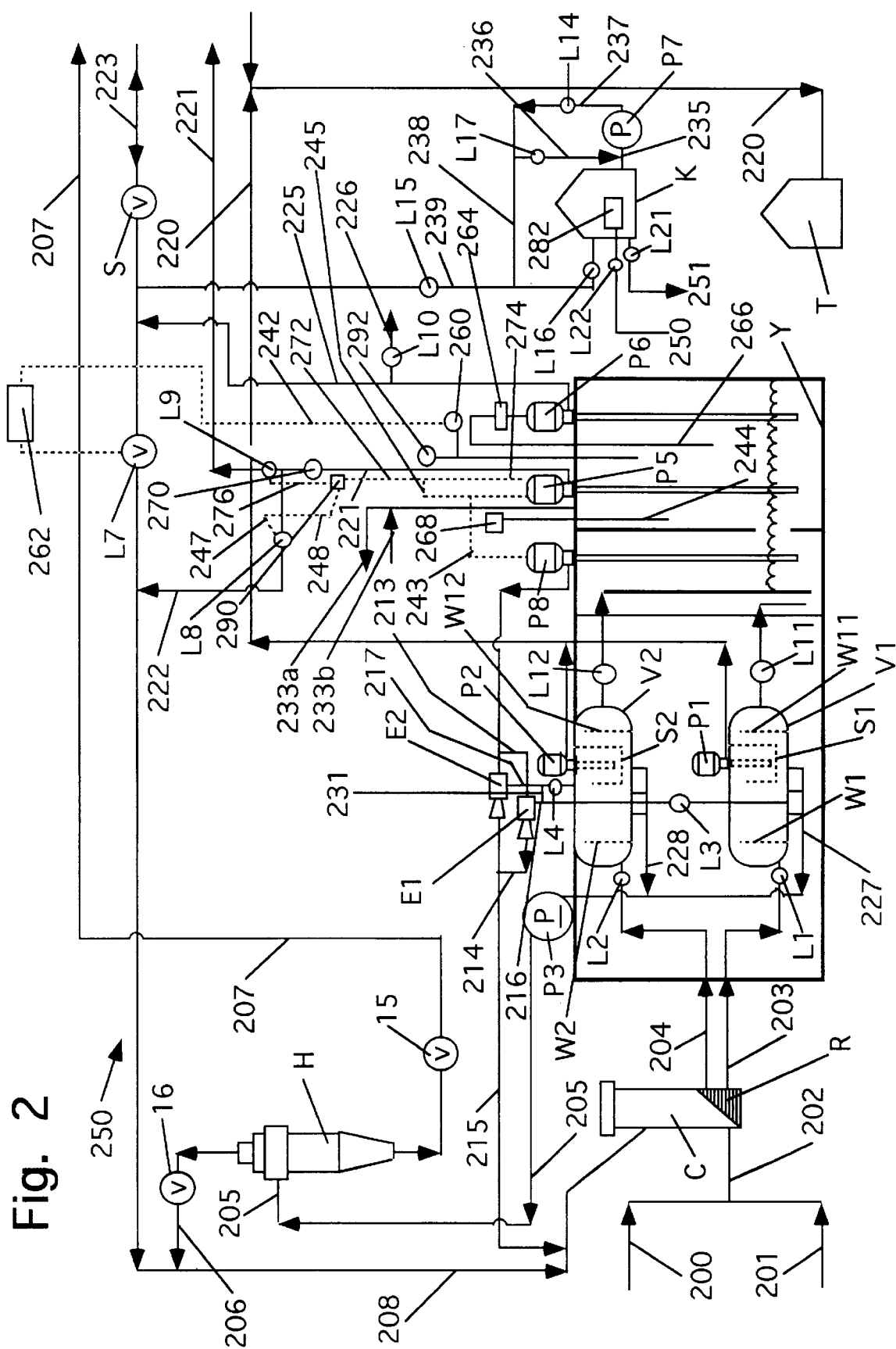
FIG. 2 is a schematic diagram of a system according to the present invention.

FIG. 2 illustrates schematically a dual-vessel system 250 and method according to the present invention. Two vessels, V1 and V2 (similar to the vessel 12 previously described) each have an internal oil sump S1, S2 respectively (similar to the sump 26 previously described); oil transfer pumps P1 and P2 respectively (similar to the pump 24 previously described); and eductors E1, E2 respectively (similar to the educator 14, previously described). These items operate, are monitored, and are controlled with similar devices and in a similar manner as those in the system of FIG. 1, previously described.

A pump P3 pumps heavier-than-water solids suspended in liquid through vessel exit lines 227, 228 to a line 205, and through it to a hydrocyclone separator H. A separator eductor pump P8 pumps water from a bay Y to the eductors E1, E2 to produce suction for effecting a vacuum and resulting siphoning action and resultant liquid siphoning in each of the vessels V1, V2. The vessels V1, V2 each contain one or more lamella plate separator packs (not shown) for removing solids and particles in the inlet wastewater. The vessels may have inlet weirs W1, W2 respectively as shown and outlet weirs W11, W12 as shown, or they may be used without any weirs or with an outlet weir only. In one preferred embodiment both vessels V1 and V2 are at the same depth below grade.

Inlet wastewater flows through inlet lines 200 and 201, to a basin inlet line 202, into a water catch basin C. Preferably in one embodiment a removable basket screen R is emplaced at the bottom of the basin C to filter out any object of a certain largest dimension, e.g. a half-inch (1.27 centimeters). Typically the screen R is made from stainless steel mesh.

From the catch basin C inlet wastewater flows in line 204 to the vessel V2 and in line 203 to the vessel V1. Valve L1 selectively isolates flow in line 203 and valve L2 selectively isolates flow in line 204 for maintenance purpose.

The eductor E1 facilitates siphoning of the wastewater into vessel V1 and vessel V2. Eductor E1 applies its vacuum through a line 216 to V1 and through a line 217 to V2. A valve L3 controls vapor flow in the line 216 and a valve L4 controls flow in the line 217. With the valves set properly, either eductor can serve both vessels via an interconnection line 231. Eductor E2 can serve as a back up for eductor E1. A valve L11 controls outlet water flow from the vessel V1 in the line 211 and a valve L12 controls outlet water flow from the vessel V2 in a line 210 for maintenance purposes.

The separator eductor pump P8 pumps cleaned water from the bay Y through the lines 212, 213 to eductor E1 and through the line 212 to the eductor E2. Water passing through the eductor E1 is routed to a line 214 then to line 215. Water passing through the eductor E2 is pumped to the line 215. Water in the line 215 is then pumped to a line 208 to be fed into the catch basin C for further processing through the system; or, alternately (not shown) out of the system. Alternatively, water from the eductors is returned to the collection bay Y.

Cleaned outlet water flows from the vessel V1 in the line 211 and from the vessel V2 in the line 210 into the collection bay Y.

Sludge solids falling from the lamella plate separator packs in the vessel V1 are pumped out in the line 227 by the pump P3; and such solids from the vessel V2 are pumped out in the line 228. The pump P3 pumps the solids in the line 205 to the hydrocyclone separator H. Separated solids flow from the bottom of the hydrocyclone H, through a line 207, to a sludge solids tank (not shown). A valve L5 controls flow in the line 207. In one embodiment, the vessels V1, V2 are below ground [in certain embodiments not below 32 feet (9.74 meters)], the hydrocyclone H is above ground, the pump(s) P3 are above ground, the sludge solids tank is above ground, the collection bay Y is below ground, and the catch basin C is below ground.

The cleaned water flows under pressure out from the hydrocyclone separator H in an exit line 206 which meets the line 208 for flow to the catch basin C. A valve L6 controls flow in the line 206. Additional water flows into the line 208 from the line 223. The water is contaminated water pumped by pump P7 from tank K in line 239. A valve L7 controls flow in the line 223 and a valve L15 controls flow from the tank K. Line 223 is used to pump storm water into the system for treatment. The oil, grease, solids and other heavier-than-water contaminants separated in the hydrocyclone H may be routed through the line 207 for further treatment.

Additional pumps P5 and P6 may be used to pump water from the collection bay Y into the line 223 for pumping to the line 208 via lines 221, 222, and 223 or for pumping the other direction (by pump P6) in the line 223 to a storage facility, pond, tank K etc. The pumps P5 and P6 may also be used to pump water for the eductors E1 and E2. Any one of the pumps P2, P5 or P6 may be used alone for normal operation of both vessels V1 and V2, both eductors E1 and E2, and for pumping cleaned water from both vessels to a storage facility in line 239 or off site through line 221.

Nitrogen is supplied to the collection bay Y and vessels V1 and V2 (as previously described for the system of FIG. 1 with a nitrogen supply system 50 connected to the line 233. Line 233*a* represents a line for the system through which vapors may be vented and line 233*b* represents a nitrogen input line).

The pump P5 pumps water from the collection bay Y in a line 221. Some flow is diverted to a line 222, and then into the line 223; or all flow goes via line 221 (with valve L8 closed) to a process water stripper in a low chemical oxygen demand ("LCOD") unit in which the water is further treated before discharge. The pump P6 pumps water from the collection bay Y through a line 225 to the line and 223 or, with valve L7 closed, to the line 223 the other way to the storage facility. Line 226 is an emergency overflow line used in extreme emergency flow conditions. A valve L10 controls flow in the line 226.

The oil transfer pump P1 pumps oil, etc. from the sump S1 of vessel V1 through lines 209 and 220 to an oil tank T. The oil transfer pump P2 pumps oil, etc. from the sump S2 of the vessel V2 to the line 220 and to the oil tank T.

The pump P7 maybe used to pump water such as treated wastewater or storm water from the tank K in lines 235, 237, 238, and 239 to the line 223. Water is introducible into the tank K through a line 240 whose flow is controlled by a valve L16 or through a line 236 whose flow is controlled by a valve L17. The valve L15 controls flow in the line 239 and a valve L14 controls flow in the line 237.

The tank K is used as a surge tank for the downstream treatment facility (e.g. an LCOD unit). When the LCOD unit can process additional water, pumps P7 are manually started and water is sent to the vessels V1 and V2 for treatment. When the level in the tank K decreases to a predetermined acceptable level, the pumps P7 automatically shut off.

Flowrate through the valve L7 is regulated by one of two parameters: a predetermined set flowrate by the controller (not shown) or by a level controller 260 with a level sensor 246 in the collection bay Y which sends a signal to the valve L7 via the line 242. A selector 262 (e.g. a computer controlled selector) controls flow through the valve L7 to the line 223 and then to line 208 or, with the valve L7 closed, through the line 223 to a storage facility etc. The selector 262 either receives a signal from a flow meter (not shown) in line 223 or a signal from the level controller 260.

A level switch 264 interconnected with a level sensor 266 in the collection bay Y turns pump P6 on when the level in collection bay Y exceeds a predetermined level and turns pump P6 off when the level falls below this predetermined level.

A level switch 268 interconnected with a level sensor 244 in the collection bay Y turns off the pumps P5 and P8, via a line 243, when the level in the collection bay Y falls below a predetermined level.

A level controller 292 interconnected with the level sensor 246 controls flow through the valve L8 and controls flow through the valve L9 via the lines 272 and 276 when the level in the collection bay is above a predetermined level. The level controller 292 turns pumps P5 on and off via a line 245 in response to predetermined high and low levels in the collection bay Y. A flow controller 270 interconnected with valves L8 and L9 controls flow through the valve L9 when the level in collection bay Y is above a predetermined level and the valve L8 when the level in bay Y is below a predetermined level. The device 290 provides selection of the controller for the valve L9, flow control with the flow control 270 or level control with the level controller 292.

A mixer 282 in the tank K maintains a homogeneous mixture in the tank K and inhibits the settling out of solids in the mixture. The tank K can be drained by opening the valve L21 to a drain line 251 (which in one embodiment flows into the sewer system and eventually to the vessels V1 and V2). If the tank K is overfilled, a valve L22 is opened to drain the tank to an acceptable level.

In one embodiment the pump P8 pumps up to 80 gallons (302.8 liters) per minute; the pump P5 pumps 900 gallons (3,406.9 liters) per minute; the pump P6 pumps 6000 gallons (22,712.4 liters) per minute; the pumps P1, P2 pump 30 gallons (113.6 liters) per minute; the tank T holds 13,000 barrels (2,066,610 liters); the tank K holds 140,000 barrels (22,255,800 liters); and the pump P7 pumps 500 gallons (1,892.7 liters) per minute. In one process according to the present invention with such a system certain streams are projected to have these characteristics:

| STREAM | 201 | 200 | 202 | 205 | 206 | 207 | 221 | 225 | 220 |
|---|---|---|---|---|---|---|---|---|---|
| Oil & Grease (PPM) | 1000 | 1000 | 1000 | 125 | 125 | 125 | 125 | — | 1000000 |
| TSS(PPM) | 1000 | 1000 | 1000 | 4167 | 463 | 37500 | 250 | — | — |
| pH | 11.0 | 11.0 | 11.0 | 11.0 | 11.0 | 11.0 | 11.0 | — | — |
| H2S(PPM) | 200 | 200 | 200 | 200 | 200 | 200 | 200 | — | — |
| FLOW(GPM) | 1000 | 1000 | 1000 | 180 | 162 | 18 | 1000 | 0 | 1.81 |

"Oil & Grease(PPM)" means measured in parts per million. Those materials are extracted from effluent with a specified solvent (e.g. freon or methylene chlorides).
"TSS(PPM)" means total suspended solids in parts per million.
"H2S(PPM)" means hydrogen sulfide in parts per million.

"Oil & Grease (PPM)" means measured in parts per million. Those materials are extracted from effluent with a specified solvent (e.g. freon or methylene chlorides).

"TSS (PPM)" means total suspended solids in parts per million.

"H2S (PPM)" means hydrogen sulfide in parts per million.

| STREAM | 201 | 200 | 202 | 205 | 206 | 207 | 221 | 225 | 220 |
|---|---|---|---|---|---|---|---|---|---|
| Oil & Grease (PPM) | 43.8 | 43.8 | 43.8 | 37.3 | 37.3 | 37.3 | 37.3 | 37.3 | 1.0E06 |
| TSS(PPM) | 87.7 | 87.7 | 87.7 | 1111 | 123 | 10000 | 78.9 | 78.9 | — |
| pH | 8.0 | 8.0 | 8.0 | 8.0 | 8.0 | 8.0 | 8.0 | 8.0 | — |
| FLOW(GPM) | 6720 | 16080 | 22800 | 180 | 162 | 18 | 1800 | 21000 | 0.91 |

The case shown above is for a projected storm water flow situation. A basin C as in FIG. 2 may be used with the system shown in FIG. 1. Another inlet screen may be used within a vessel as an inlet deflection baffle for uniform flow distribution over the lamella plate packs or other separation elements used in the vessel.

Figure 3:
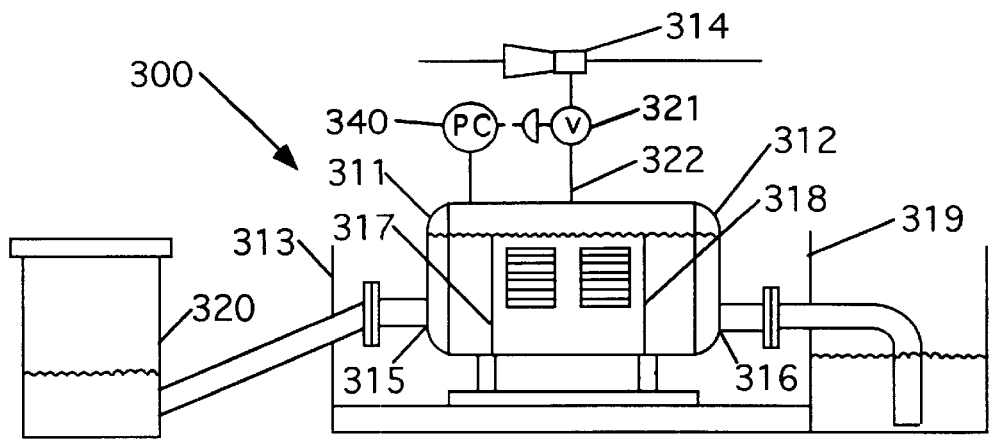
FIG. 3 is a schematic diagram of a system according to the present invention.

FIG. 3 shows schematically a system 300 according to the present invention with a treatment vessel 312 in a bay 313. The vessel 312 has a body 311, an inlet 315, an outlet 316, an inlet weir 317, and an outlet weir 318. An eductor 314 (like the eductor 14 previously described) provides a vacuum in the vapor space at the top of the vessel 312. As shown, inlet water from a water source 320 has been siphoned into the vessel 312, flowed over the inlet weir 317 and filled the vessel to a level L, flowing over the outlet weir 318. Siphoning action effects flow through the vessel, to the outlet 316,, and into a collection bay 319 with a water level W lower than level L in the vessel 312 and lower than the water source 320. Preferably one or more lamella separator plate packs 330 are used to separate contaminates, e.g. suspended solids, from the inlet wastewater containing contaminates. A pressure controller 340 monitors pressure in the vessel 312 and controls a valve 321 which controls fluid flow in a line 322 to the eductor 314 and shuts off fluid flow automatically if the vacuum in the vessel increases to an undesired predetermined set level.

Figure 4:
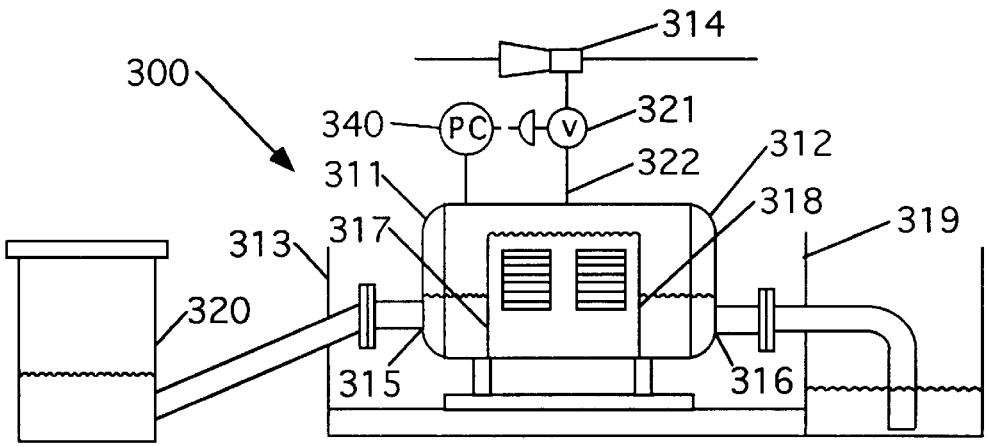
FIG. 4 is a schematic diagram of a system according to the present invention.

FIG. 4 illustrates the system 300 shut down, e.g. voluntarily or due to an insufficient vacuum level in the vessel 312 or low water level of the water source 320. Water to the right of the outlet weir 317 can flow into the bay 319, but siphoning action will cease.

Figure 5:
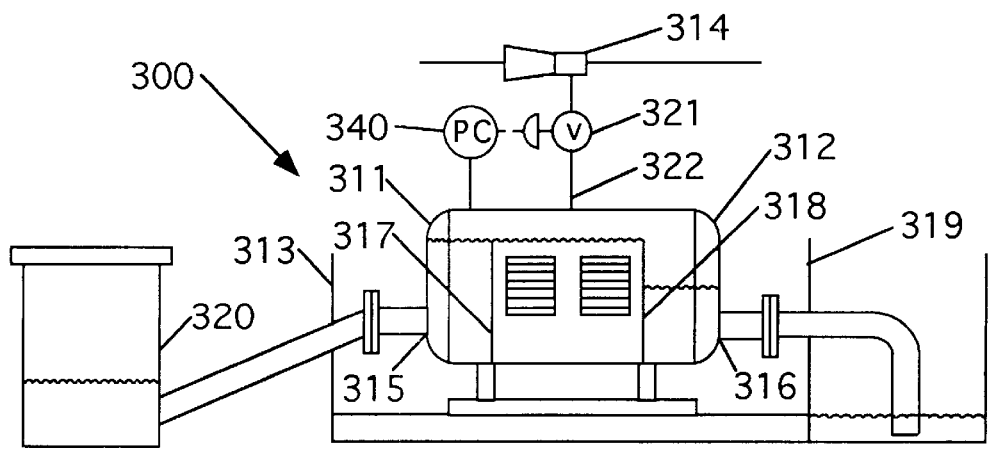
FIG. 5 is a schematic diagram of a system according to the present invention.

FIG. 5 shows the system 300 with the level of water to the right of the outlet weir 318 lower than that of the water between the weirs and at the inlet. Without vacuum the system will operate to the extent that the water between the outlet weir 318 and the outlet 316 will flow into the bay 319.

Figure 6:
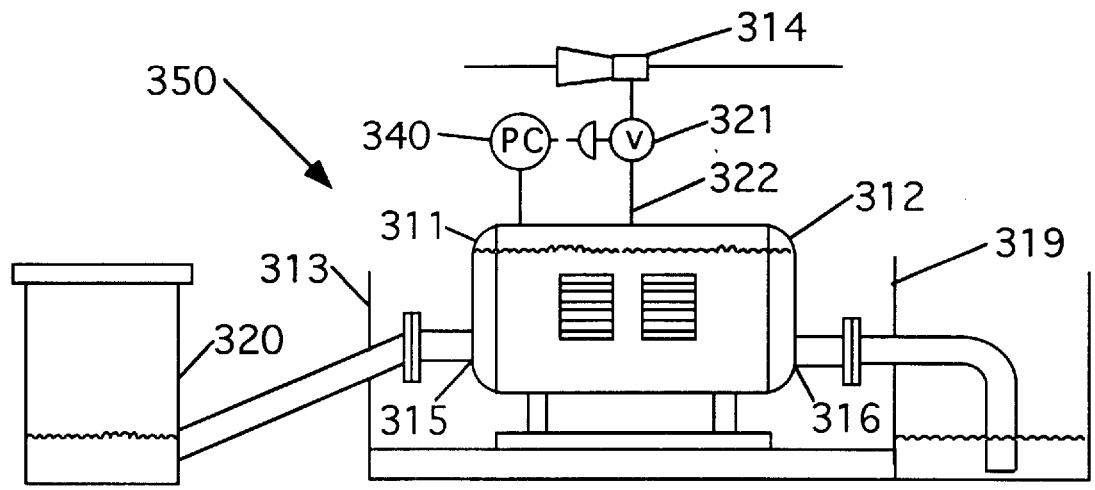
FIG. 6 is a schematic diagram of a system according to the present invention.

FIG. 6 illustrates a system 350 with no inlet or outlet weir and operation with a vacuum provided by the eductor 314. Similar items in FIGS. 6 and 3 have the same identifying numerals. Siphoning action moves the water through the vessel 312, through the separator apparatuses 324, and no weirs impede or control this movement.

Figure 7:
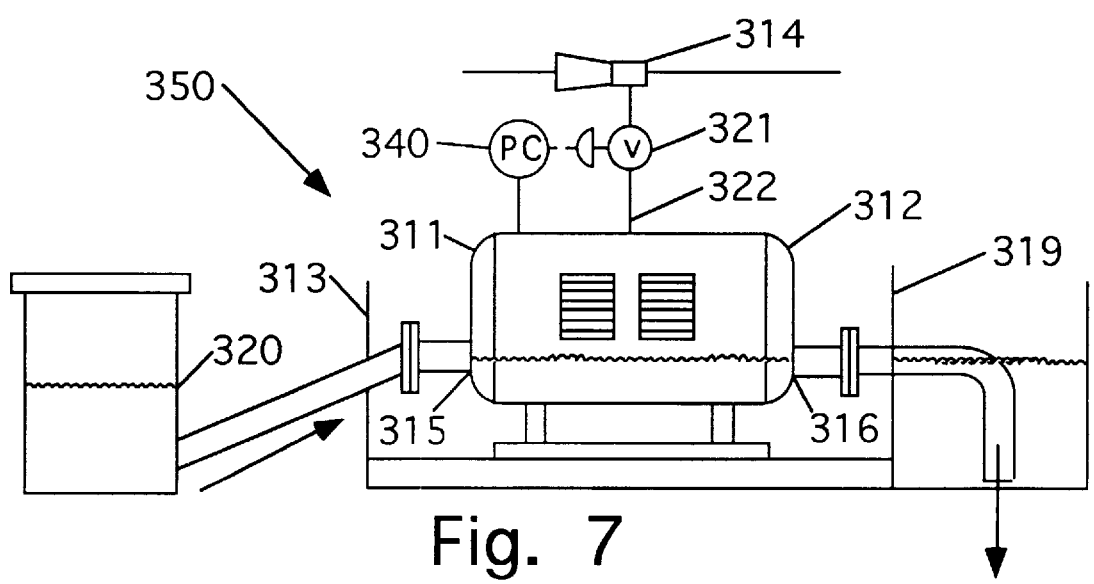
FIG. 7 is a schematic diagram of a system according to the present invention.

FIG. 7 shows the operation of the system 350 without vacuum, with constant fluid flow, and that does not use the lamella separators and does not separate oil and solids. Sediment from the vessel bottom is not removed in this embodiment.

It is most preferred in embodiments disclosed herein that there be no moving parts for effecting the treatment of the wastewater, i.e., no moving parts in the vessel or in its inlets and outlets, including but not limited to no scrapers or rakes for scraping and moving solids; and that the vessel(s) be disposed, in certain embodiments in existing concrete pits or containment bays providing double containment for effluents.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A method for treating wastewater containing contaminates and contaminating suspended solids in a vessel, the vessel having an inlet for the contaminated wastewater and an outlet for treated wastewater from which contaminates have been separated, the vessel having a top opening and a bottom, the method comprising drawing wastewater into the vessel with a vacuum applied at the top opening, creating a siphoning action which effects flow of the wastewater through the vessel to the outlet, the vacuum being applied by an eductor device with suction created by pumping water through it with a pump, flowing the wastewater through separation apparatus in the vessel to separate contaminates from the wastewater so that wastewater with contaminates separate therefrom flows out the outlet, flowing the wastewater with contaminates separated therefrom into a collection bay in fluid communication with the outlet, a top level of wastewater in the vessel being above the collection bay into which flows wastewater with contaminates separated therefrom, collecting lighter-than-water contaminates in a sump in the vessel, pumping collected lighter-than-water contaminates from the sump and out of the vessel, monitoring vacuum level in the vessel, providing inert gas under pressure into the vessel to prevent the eductor device from collapsing the vessel, separating suspended solids from the wastewater with the separation apparatus, and removing separated suspended solids in a fluid stream with water from the bottom of the vessel, the fluid stream from the bottom of the vessel being 20% or less solids by weight.

2. The method of claim 1 wherein the fluid stream with separated suspended solids is 2% or less solids by weight.

3. The method of claim 1 further comprising selectively pumping water to the bottom of the vessel to facilitate removal of solids from the vessel.

4. The method of claim 1 further comprising flowing the fluid stream with suspended solids to a liquid-solid separator and separating suspended solids therein from the fluid stream.

5. The method of claim 4 further comprising flowing water which has previously passed through the solids separation apparatus to the inlet of the vessel for further cleaning.

6. The method of claim 1 further comprising screening he wastewater containing contaminates with a screen prior to flowing it into the vessel to remove objects of a certain largest dimension or greater.

7. The method of claim 6 wherein siphoning action pulls the wastewater through the screen into the vessel, the vessel being at a higher elevation than the screen.

8. The method of claim 1 further comprising removing vapors from the vessel and collecting them so they do not escape to the atmosphere.

9. The method of claim 1 wherein the vessel is contained in a below-grade wastewater collection container.

* * * * *